United States Patent
Loftus et al.

(10) Patent No.: US 11,210,267 B2
(45) Date of Patent: Dec. 28, 2021

(54) ELECTRONIC CONTROL UNIT COMPARISON

(71) Applicant: Ford Global Technologies, LLC, Dearborn, MI (US)

(72) Inventors: Michael Edward Loftus, Northville, MI (US); Andrew Stephen Barrett, Whitehall, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 16/419,855

(22) Filed: May 22, 2019

(65) Prior Publication Data

US 2020/0371997 A1 Nov. 26, 2020

(51) Int. Cl.
| | |
|---|---|
| *G06F 16/17* | (2019.01) |
| *G06F 16/16* | (2019.01) |
| *G06F 16/25* | (2019.01) |
| *G06F 16/31* | (2019.01) |
| *G06F 16/2457* | (2019.01) |
| *G06F 16/901* | (2019.01) |

(52) U.S. Cl.
CPC .......... *G06F 16/17* (2019.01); *G06F 16/164* (2019.01); *G06F 16/24578* (2019.01); *G06F 16/252* (2019.01); *G06F 16/313* (2019.01); *G06F 16/322* (2019.01); *G06F 16/9027* (2019.01)

(58) Field of Classification Search
CPC ...... G06F 16/17; G06F 16/252; G06F 16/164; G06F 16/2245; G06F 16/24578; G06F 16/313; G06F 16/322; G06F 16/9027
USPC ......................................... 707/821, 748–752
See application file for complete search history.

(56) References Cited

U.S. PATENT DOCUMENTS

| | | | | |
|---|---|---|---|---|
| 5,819,269 A | * | 10/1998 | Uomini | .................. G06F 16/38 |
| 7,653,695 B2 | | 1/2010 | Flury et al. | |
| 9,037,994 B2 | | 5/2015 | Advani | |
| 2004/0225417 A1 | * | 11/2004 | Sano | .................. B60R 16/0315 |
| | | | | 701/1 |
| 2005/0192716 A1 | * | 9/2005 | Ito | .......................... B60R 25/00 |
| | | | | 701/1 |
| 2008/0021607 A1 | * | 1/2008 | Kato | ...................... G07C 5/085 |
| | | | | 701/31.4 |

(Continued)

FOREIGN PATENT DOCUMENTS

CN 103108043 A * 5/2013 ............ H04L 29/08

OTHER PUBLICATIONS

Yasuhiro Ohara, "BGPdump2: A Tool to Read and Compare the BGP RIB Dump Files", RIPE Labs, May 12, 2015, retrieved from Internet URL: https://labs.ripe.net/Members/yasuhiro_ohara/bgpdump2 (6 pages).

(Continued)

*Primary Examiner* — Shahid A Alam
(74) *Attorney, Agent, or Firm* — Brandon Hicks; Bejin Bieneman PLC (57) ABSTRACT

A method includes selecting, from a database, messages of a first electronic control (ECU) unit according to a specified datum that the first ECU is programmed to provide via a communications bus, generating a first file of the messages of the first ECU, sorting the messages in the first file according to a hierarchy that includes the specified datum, and outputting a third file describing a comparison of the first file and a second file that includes messages of a second ECU.

20 Claims, 4 Drawing Sheets

(56) References Cited

U.S. PATENT DOCUMENTS

2014/0180961 A1    6/2014   Hankins et al.
2017/0228417 A1    8/2017   Maccanti et al.

OTHER PUBLICATIONS

"php—Sorting Postgresql Database Dump (pg_dump)—Stack Overflow", retrieved from Internet URL: https://stackoverflow.com/questions/2204640/sorting-postgresql-database-dump-pg-dump (2 pages).

* cited by examiner

ELECTRONIC CONTROL UNIT COMPARISON

BACKGROUND

A first vehicle may include one or more electronic control units that may operate and/or monitor one or more vehicle components. The electronic control units may receive messages from various vehicle components and transmit messages to various vehicle components including a vehicle computer. The vehicle computer may store the messages from the one or more electronic control units in a database. A second vehicle may include similar or substantially identical electronic control units as the first vehicle. However, the database stored on a computer of the first vehicle may include different programming, e.g., may use different formats, orders of operation, etc., for similar or identical data elements, than a database stored on a second vehicle computer.

DETAILED DESCRIPTION

A method can comprise selecting, from a database, messages of a first electronic control unit (ECU) according to a specified datum that the first ECU is programmed to provide via a communications bus, generating a first file of the messages of the first ECU, sorting the messages in the first file according to a hierarchy that includes the specified datum, and outputting a third file describing a comparison of the first file and a second file that includes messages of a second ECU.

The method can include sorting the messages in the first file according to an identifier.

The method can include sorting data in the messages in the first file according to a descriptor.

The method can include sorting messages of the second file according to the hierarchy.

The third file can include at least one of a side-by-side comparison of the first file and the second file and a list of differences between the first file and the second file.

The method can include displaying each message of the first file on a separate line and displaying each datum of each message of the first file on a separate line.

The method can include displaying metadata of each message of the first file on the same line as the respective message and displaying metadata of data of each message of the first file on the same line as the respective data.

The hierarchy can include the data below the respective message, each message below the first ECU, and the first ECU below the database.

The specified datum can be at least one of a name of the first ECU, metadata of the messages of the first file, and metadata of data of the messages of the first file.

Each message can include an identifier and data of at least one physical characteristic of a vehicle component.

A system can comprise a compute include a processor and a memory, the memory storing instructions executable by the processor to select, from a database, messages of a first ECU according to a specified datum that the ECU is programmed to provide via a communications bus, generate a first file of the messages and the specified datum of the first electronic control unit, sort the messages in the first file according to a hierarchy that includes the specified datum, and output a third file describing a comparison of the first file and a second file that includes messages of a second ECU.

The instructions can further include instructions to sort the messages in the first file according to an identifier.

The instructions can further include instructions to sort data in the messages in the first file according to a descriptor.

The instructions can further include instructions to sort the messages of the second file according to the hierarchy.

The third file can include at least one of a side-by-side comparison of the first file and the second file and a list of differences between the first file and the second file.

The instructions can further include instructions to display each message of the first file on a separate line and displaying each datum of each message of the first file on a separate line.

The instructions can further include instructions to display metadata of each message of the first file on the same line as the respective message and to display metadata of data of each message of the first file on the same line as the respective data.

The hierarchy can include the data below the respective message, each message below the first ECU, and the first ECU below the database.

The specified datum can be at least one of a name of the first ECU, metadata of the messages of the first file, and metadata of data of the messages of the first file.

Each message can include an identifier and data of at least one physical characteristic of a vehicle component.

Figure 1:
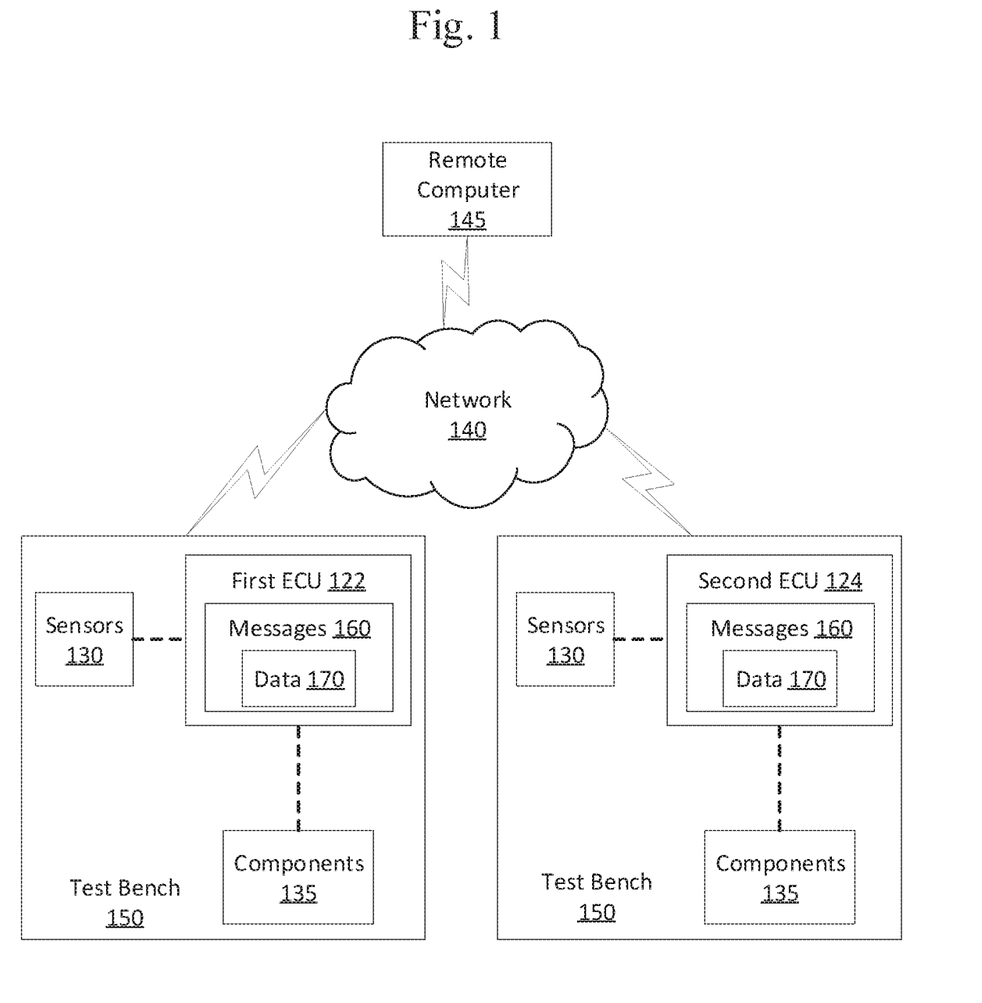
FIG. 1 is a block diagram illustrating an example system to compare a first electronic control unit (ECU) of a first vehicle to a second ECU of a second vehicle.

FIG. 1 is a block diagram of an example system 100 including a remote computer 145 programmed to receive two databases 155 from a test bench 150, generate a first file and a second file from the databases 155 based on a specified datum, and to output a comparison of the first file and the second file. Electronic control units (ECUs) 120 may be interchangeable on the test bench 150, e.g., to conduct separate tests, such that each ECU 120 may output data, e.g., from a respective test, into one respective database 155. In this situation, each ECU 120 may transmit the respective database 155 to the remote computer 145, e.g., after the respective test, as discussed below. A user may compare data within the databases 155 as part of technical testing and/or for verification of programming updates made to one of the ECUs 120. However, the databases 155 may have different programming such that the databases 155 store and present output in different formats, which can make comparing data within the databases 155 complex and expensive. The remote computer 145 can generate a file based on the specified datum and organized according to a data hierarchy 300 (see FIG. 3) for each ECU 120, which allows the remote computer 145 to quickly compare data output from multiple ECUs 120 regardless of any programming differences between respective databases 155.

The test bench 150 can simulate operating conditions of a vehicle. The test bench 150 may include hardware and software such as is known (or could be a test setup developed or built in the future). The test bench 150 may include the ECU 120, sensors 125, and vehicle components 130 comprising a vehicle subsystem, e.g., the powertrain subsystem, the braking subsystem, the steering subsystem, etc.

An "electronic control unit" (ECU) is a device including a processor and a memory that includes programming (i.e., the memory stores instructions executable by the processor) to control one or more vehicle components 130.

The ECU 120 is generally arranged for communications on a communication network that can include a controller area network (CAN) or the like, and/or other wired and/or wireless mechanisms. Via the communication network, the ECU 120 may receive messages (e.g., CAN messages) from the various devices, e.g., sensors 125, on the test bench 150. For example, the sensors 125 may provide the ECU 120 with data about the components 130 being tested. As mentioned below, various controllers and/or sensors 125 may provide data to the ECU 120 via the communication network. Additionally, the ECU 120 may transmit messages to the remote computer 145, e.g., via a network 140 as discussed below.

The ECU 120 can collect and process data about the vehicle components 130 being tested. Based on the data, the ECU 120 can actuate the vehicle components 130 during the test. For example, the vehicle subsystem being tested can be the powertrain subsystem, a brake subsystem, a steering subsystem, etc. In these circumstances, the ECU 120 can be a powertrain controller, a brake controller, a steering controller, etc. The ECU 120 can control operation of the vehicle components 130 of the vehicle subsystem being tested. For example, the operation can be controlling steering, controlling braking, controlling a human-machine interface, etc.

A first ECU 122 may be installed on the test bench 150 for a first test of the vehicle subsystem. Following the first test, the first ECU 122 may be replaced with a second ECU 124, e.g., for a second test. As another example, the system 100 can include the second ECU 124 installed on a second test bench 150 such that the first test and the second test can be performed simultaneously. The first ECU 122 and the second ECU 124 may be the same type of ECU 120. In other words, the first ECU 122 and the second ECU 124 may monitor and/or control the same vehicle subsystem, e.g., the powertrain subsystem, the braking subsystem, the steering subsystem, etc.

Each ECU 120 may output data to the respective database 155 from the vehicle subsystem being tested on the test bench 150 according to the format of the respective database 155 (as discussed below). For example, each ECU 120 may receive the format of the respective database 155 corresponding to the respective ECU 120. In other words, each ECU may receive a portion of the database 155 and store data according to the format of the received portion of the database 155.

Each ECU 120 can include a name. In this context, a "name" is a string of data corresponding to the specific ECU 120, i.e., an identifier for the ECU 120. In other words, the name identifies the specific ECU. The name can be, e.g., a string of alphanumeric bits, a string of binary digits, a string of hexadecimal digits, etc. In the context of this disclosure, the first ECU 122 and the second ECU 124 may have the same name. The remote computer 145 may communicate with the ECU 120 based on identifying the ECU 120 by the name, as discussed below.

Sensors 125 can include a variety of devices. For example, various controllers on a test bench 150 may operate as sensors 125 to provide data via wired communication, e.g., data relating to subsystem and/or component status, to the ECU 120. Further, other sensors 125 could include cameras, motion detectors, etc., i.e., sensors 125 to provide data for evaluating a position of a component, a condition of a component, etc. The sensors 125 could, without limitation, also include radar, LIDAR, and/or ultrasonic transducers.

The test bench 150 can test one or more vehicle components 130. For example, the test bench 150 can include each vehicle component 135 of the subsystem simulated by the test bench 150. As another example, the test bench 150 can include vehicle components 130 constituting a portion of the subsystem, one vehicle component 135, etc. In this context, each vehicle component 135 includes one or more hardware components adapted to perform a mechanical function or operation—such as moving the vehicle, slowing or stopping the vehicle, steering the vehicle, etc. Non-limiting examples of components 130 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, or the like.

A network 140 represents one or more mechanisms by which the ECU 120 on the test bench 150 may communicate with the remote computer 145. Accordingly, the network 140 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 140 include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote computer 145 includes a processor and a memory such as are known. The memory includes one or more forms of computer-readable media, and stores instructions executable by the remote computer 145 for performing various operations, including as disclosed herein.

The remote computer 145 can receive the database 155 from the first ECU 122 following a first test on the test bench 150. In these circumstances, the first ECU 122 outputs data from the first test into the database 155 according to the programming, i.e., format, of the database 155. The remote computer 145 can receive the database 155 from the second ECU 124 following a second test on the test bench 150. In these circumstances, the second ECU 124 outputs data from the first test into the database 155 according to the programming, i.e., format, of the database 155. The format of the database 155 received by the first ECU 122 can differ from the format of the database 155 received by the second ECU 124.

Figure 3:
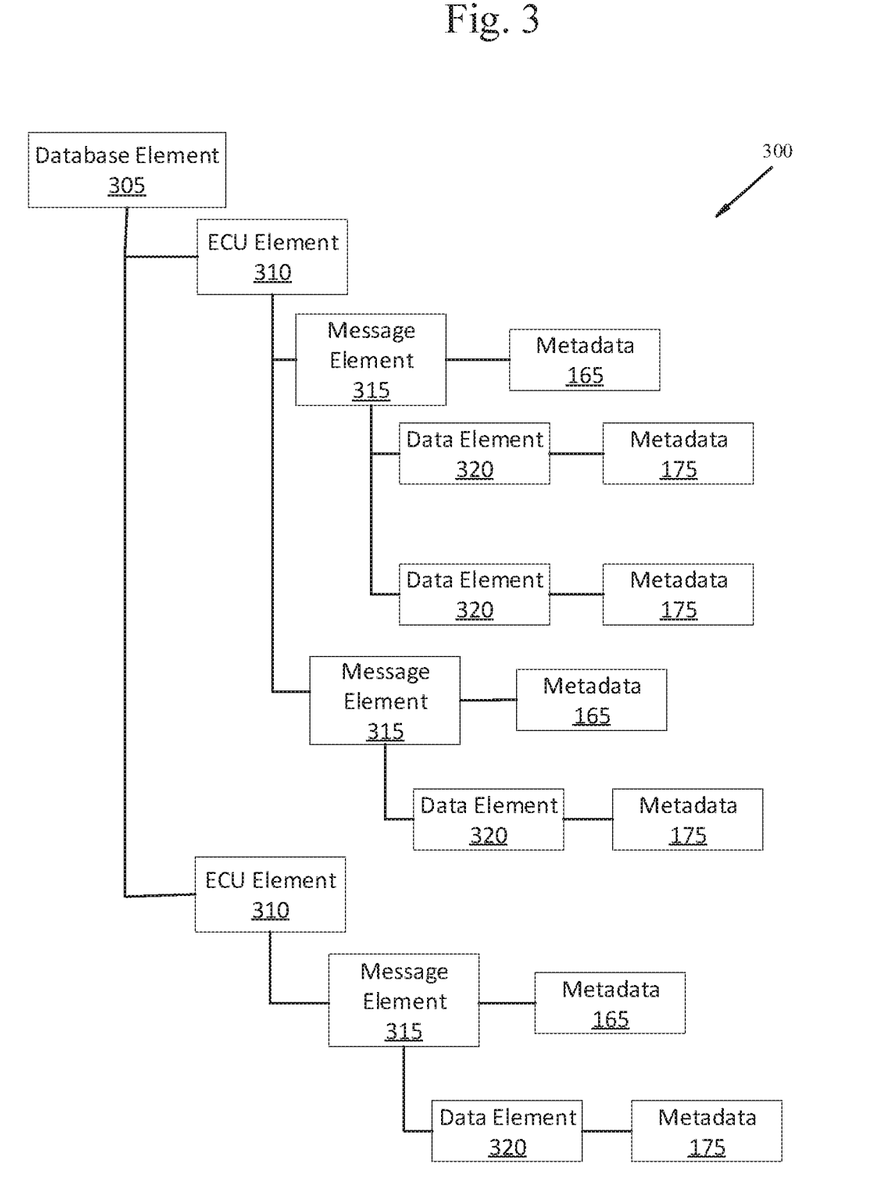
FIG. 3 is a block diagram illustrating an example hierarchy.

The remote computer 145 can receive the specified datum, e.g., from a user. In this context, a "specified datum" is a string of data corresponding to specific data contained within a specific ECU 120, e.g., desired by a user. The specified datum can be, e.g., a string of alphanumeric bits, a string of binary digits, a string of hexadecimal digits, etc. The specified datum is included in a data hierarchy 300 (FIG. 3). For example, the specified datum can be at least one of the name of the ECU 120, a message identifier (as discussed below), metadata of the messages (as discussed below), and metadata of data of the messages (as discussed below).

The remote computer 145 can receive one or more specified datum. The remote computer 145 can select one or more messages 160 (as discussed below) from each ECU 120 based on the specified datum. For example, if the specified datum merely identifies the ECU 120, then the remote computer 145 can select all the messages 160 from the identified ECU 120. In these circumstances, the specified datum may be the name of the ECU 120. As another example, if the specified datum identifies the ECU 120 and specific messages 160 within the ECU 120, then the remote computer 145 can select specific messages 160 of the identified ECU 120. The remote computer 145 selects messages 160 of the first ECU 122 and messages 160 of the second ECU 124 according to the same specified datum.

The remote computer 145 can generate the first file based on the messages 160 from the first ECU 122 and the second file based on the messages 160 from the second ECU 124. In other words, the remote computer 145 filters the database 155 from the first test for the messages 160 of the first ECU 122 that match the specified datum and inputs the messages 160 into the first file. Similarly, the remote computer 145 filters the database 155 from the second test for the messages 160 of the second ECU 124 that match the specified datum and inputs the messages 160 into the second file. The remote computer 145 sorts the first file and the second file according to the data hierarchy 300 as discussed further below with respect to FIG. 3.

The remote computer 145 can compare the first file to the second file. Since the remote computer 145 sorted the first file and the second file according to the data hierarchy 300 the remote computer 145 can quickly compare the first and second files. Additionally, the remote computer 145 can generate a third file based on the comparison of the first file to the second file and output the third file, e.g., for a user to review. The third file may include at least one of a side-by-side comparison of the first file and the second file and a list of differences between the first file and the second file. For example, the third file may display the first file next to the second file, e.g., to allow a user to easily compare the first file to the second file. Additionally, the third file can include visual indications of identified differences between the first file and the second file, e.g., by highlighting each line that is different between the files, by altering the color of characters that are different between the files, etc.

Figure 2:
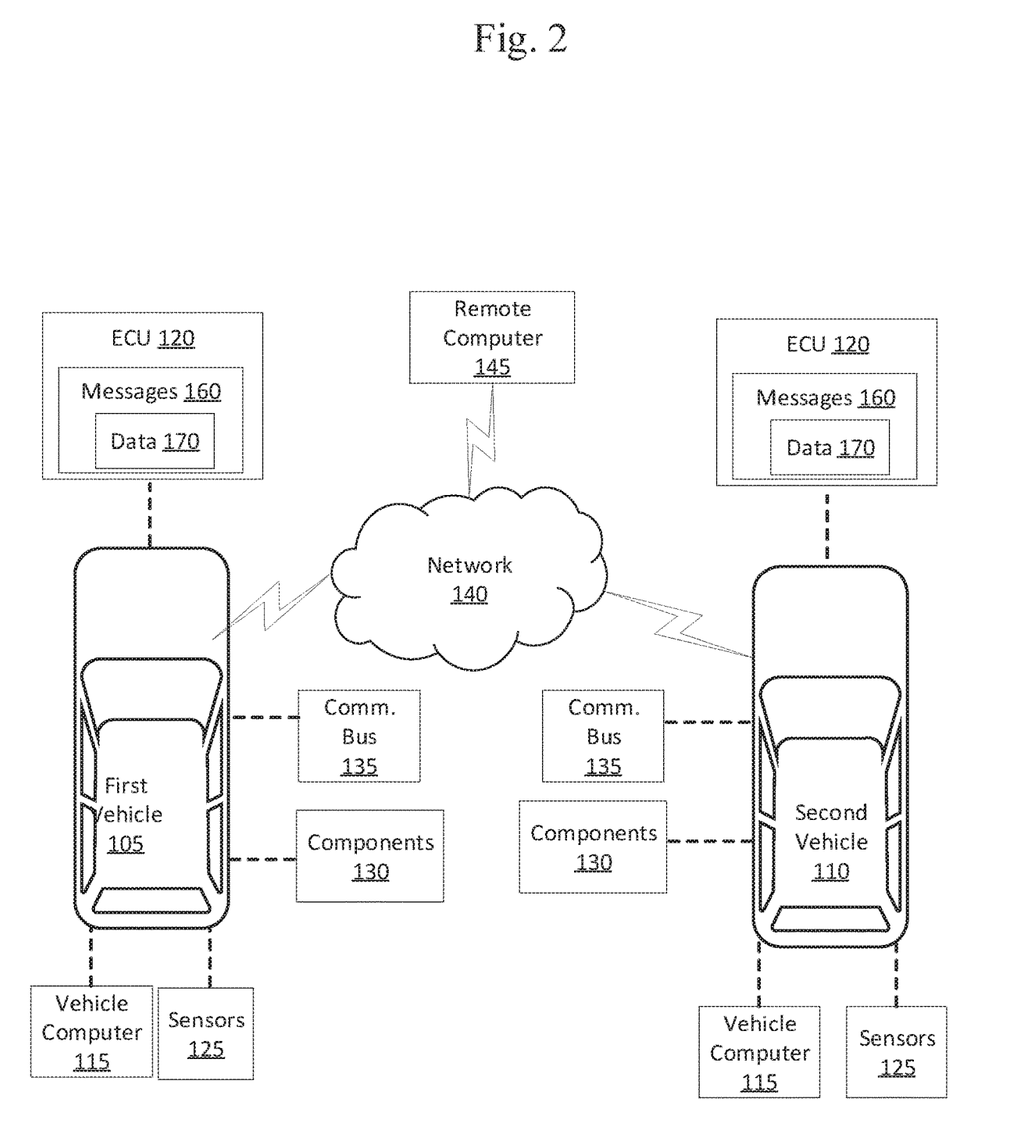
FIG. 2 is a block diagram illustrating an example system to compare the first ECU to the second ECU on a test bench.

FIG. 2 is a block diagram of an example system 200 including the remote computer 145 programmed to receive a database 155 from a vehicle computer 115 of a first vehicle 105 and a database 155 from a vehicle computer 115 of a second vehicle 110, to generate a first file and a second file based on data in the databases 155 matching specified datum, and to compare the first file to the second file.

Each vehicle 105, 110 includes a vehicle computer 115, one or more ECUs 120, sensors 125, vehicle components 130, and a communications bus 135. Via a network 140, the communications bus 135 allows the vehicle computer 115 to communicate with the remote computer 145.

The vehicle computer 115 includes a processor and a memory such as are known. The memory includes one or more forms of computer-readable media, and stores instructions executable by the vehicle computer 115 for performing various operations, including as disclosed herein.

The vehicle computer 115 may be communicatively coupled to, e.g., via a vehicle network such as a communications bus 135 as described further below, each ECU 120 in the vehicle. The vehicle computer 115 is generally arranged for communications on a vehicle communication network that can include a communications bus 135 in the vehicle such as a controller area network (CAN) or the like, and/or other wired and/or wireless mechanisms.

As discussed above, each ECU 120 may receive the format for a portion of the database 155. The vehicle computer 115 may store the database 155 for each ECU 120, e.g., in the memory of the vehicle computer 115. In this situation, the vehicle computer 115 combines the database 155 for individual ECUs 120 into one collective database 155 for the vehicle. For example, the vehicle computer 115 may receive data from each ECU 120 and store the data in the database 155. The vehicle computer 115 may transmit the database 155 to the remote computer 145, e.g., via a network 140 as described further below.

The ECUs 120 are generally arranged for communications on a vehicle communication network that can include the communications bus 135 in the vehicle such as a controller area network (CAN) or the like, and/or other wired and/or wireless mechanisms. Via the vehicle network, the ECUs 120 may transmit messages to various devices, e.g., the vehicle computer 115, in the vehicle and/or receive messages (e.g., CAN messages) from the various devices, e.g., sensors 125, actuators, a human-machine interface (HMI), etc. Alternatively, or additionally, in cases where each ECU 120 actually comprises a plurality of devices, the vehicle communication network may be used for communications between devices represented as each ECU 120 in this disclosure. Further, as mentioned below, various controllers and/or sensors 125 may provide data to the ECUs 120 via the vehicle communication network.

Each one of the ECUs 120 can collect and process data about one or more vehicle components 130. Based on the data, one or more of the ECUs 120 can actuate one or more vehicle components 130. For example, the ECUs 120 can be a powertrain controller, a brake controller, a steering controller, etc. The ECUs 120 can control operation of one or more vehicle components 130. For example, the operation can be controlling vehicle steering, controlling vehicle propulsion, controlling a human-machine interface, etc.

Sensors 125 can include a variety of devices as discussed above. For example, various controllers in a vehicle may operate as sensors 125 to provide data via the vehicle network, e.g., data relating to vehicle speed, acceleration, position, subsystem and/or component status, etc., to the ECUs 120. Additionally, the vehicle can include a plurality of vehicle components 130 as discussed above, e.g., a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, or the like.

The network 140 represents one or more mechanisms by which the vehicle computer 115 may communicate with the remote computer 145. The network 140 may be the same as the network 140 identified above. Accordingly, the network 140 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized).

In the example of FIG. 2, the remote computer 145 may receive the database 155 from the vehicle computer 115 of the first vehicle 105 and the database 155 from the vehicle computer 115 of the second vehicle 110. The remote computer 145 can select messages 160 from the databases 155 to generate the first file and the second file, respectively, based on the specified datum. Since each database 155 includes messages 160 from multiple ECUs 120, the specified datum may identify one ECU 120 in each database 155, e.g., by identifying the name of the ECU 120. Additionally, the specified datum may, e.g., identify specific messages 160. The remote computer 145 may compare the first file to the second file, generate a third file based on the comparison, and output the third file as discussed above.

FIG. 3 is a block diagram of an example data hierarchy 300. The data hierarchy 300 is a model of data having hierarchical relationships and may include data identifying a database 155 element 305, ECU 120 elements 310, message 160 elements 315 for respective ECUs 120 (i.e., as shown, beneath the ECU 120 elements 310 in the data hierarchy 300), and data 170 elements 320 of respective messages 160. The data hierarchy 300 may, for example, be a tree-like data structure that includes parent nodes having child nodes. The parent nodes may have a one-to-many relationship with the child nodes. In other words, the parent node may be linked to multiple child nodes while each child node is linked to one parent node.

The database 155 may include various kinds of mechanisms for storing, accessing, and retrieving various kinds of data. For example, the database 155 may be a relational database management system (RDBMS). An RDBMS generally employs the Structured Query Language (SQL) in addition to a language for creating, storing, editing, and executing stored procedures, such as the PL/SQL language. As another example, the database 155 in the context of this disclosure may be an application database in a proprietary format, a set of files stored in various formats in a file system, etc. The database 155 may be stored on a central computer, e.g., a server, the vehicle computer 115, etc. The central computer can transmit a portion of the database 155 to the respective ECU 120, e.g., when the ECU 120 is initially programmed. Specifically, each ECU 120 may receive the portion of the database 155 corresponding to the respective ECU 120. Each ECU 120 may output data to the respective portion of the database 155 from the vehicle subsystem according to the format of the respective portion of the database 155.

The database 155 may be updated to a new version, e.g., based on performance needs of a vehicle, ECU 120 supplier updates, etc., with modified or revised programming such that the format of the database 155 can be different between versions of the database 155. In other words, multiple versions of the database 155 may include data elements in common but also respective data elements not common to first and second versions of the database 155. Each database 155 may store data according to a format that specifies one or more data each ECU 120 is programmed to provide, a format for a data element, i.e., a length and or data type, such as a length of an alphanumeric string and/or a possible range of values, and also a location of a data element in a message or messages. Different versions of the database 155 may identify different data respective ECUs 120 are programmed to obtain (e.g., ECUs 120 that receive different versions of the database 155 may output the same message 160 based on different data 170) and/or may identify different storage locations for the specified data.

Each database 155 can include a version identifier or name. In this context, a "version name" is a string of data corresponding to the specific database 155, i.e., an identifier for the database 155. The version name can be, e.g., a string of alphanumeric bits, a string of binary digits, a string of hexadecimal digits, etc. In the context of this disclosure, the remote computer 145 may display the version name of the database 155 in the respective file.

The database 155 element 305 may be the root of the data hierarchy 300, i.e., above all other elements 310, 315, 320 without a parent node or having a parent node of NULL in the database hierarchy 300. The database 155 element 305 may be the version name of the respective database 155. For example, the remote computer 145 may display the version name of the respective database 155 in the first and second files.

The database 155 provides the format to each ECU 120, and each ECU 120 outputs data into the database 155 according to the received format. For example, each ECU 120 may receive the format of the database 155, store data according to the format of the database 155 and transmit the stored data to the vehicle computer 115 in the format of the database 155. In these circumstances, the data from each ECU 120 may be uploaded to the database 155 according to the format of the database 155. Accordingly, the ECU 120 elements 310 are children of the database 155 element 305 in the data hierarchy 300. The ECU 120 elements 310 may be stored according to their place in the data hierarchy 300 and further ECU 120 elements 310 that are children of a same parent database 155 element 305 may be stored according to a sorting rule. For example, the remote computer 145 may sort the ECU 120 elements 310 according to respective names of the ECUs 120. For example, the remote computer 145 may display the names of the respective ECUs 120 in the first and second files. The remote computer 145 may sort by, e.g., alphabetizing the names of the ECUs 120, arranging the names in ascending or descending order, etc. By sorting the ECU 120 elements 310, e.g., by name, the remote computer 145 can display the same ECU 120 elements 310 on corresponding lines in the first file and the second file, which allows the remote computer 145 to compare messages 160 of the respective ECUs 120 more quickly than otherwise possible.

Each ECU 120 outputs messages 160, e.g., according to the format of the database 155. The messages 160 are output by the ECU 120 based on data 170, e.g., received from sensors 125, vehicle components 130, etc. Each message 160 may indicate status of a vehicle component 135. For example, a message 160 may indicate that the vehicle component 135 is operating as intended. As another example, a message 160 may indicate that the vehicle component 135 is operating improperly, e.g., outside of an intended operating range. Accordingly, the message 160 elements 315 are children of the respective ECU 120 elements 310 in the data hierarchy 300.

Each message 160 includes an identifier and data 170 of at least one characteristic of a vehicle component 135 (as discussed below). In this context, a "identifier" is a string of data substantially uniquely corresponding to the specific message 160. In other words, the identifier identifies the specific message 160. The identifier can be, e.g., a string of alphanumeric bits, a string of binary digits, a string of hexadecimal digits, etc. In the context of this disclosure, the identifier can indicate a priority of the message 160. For example, a message 160 having an identifier with a lower binary value may receive a higher priority than a message 160 having an identifier with a higher binary value. In this situation, the message 160 having an identifier with the lower binary value may be transmitted during a conflict with the message 160 having an identifier with the higher binary value, which may be delayed until no conflict is present.

The message 160 elements 315 may be stored with a pointer to or description of their place in the data hierarchy 300; further, message 160 elements 315 that are children of a same parent ECU 120 element 310 may be stored according to a sorting rule. For example, the remote computer 145 may sort the message 160 elements 315 according to the identifier of the messages 160. The remote computer 145 may sort by, e.g., alphabetizing the identifier of the messages 160, arranging the identifier in ascending or descending order, etc. Sorting the message 160 elements 315 within the data hierarchy 300 can allow the remote computer 145 to quickly compare messages 160 of the first ECU 122 to messages 160 of the second ECU 124. The remote computer 145 may store each message 160 element 315 on a separate line of the respective file. Since the remote computer 145 sorts the message 160 elements 315 of the first file and the second file according to the identifier, the respective message 160 elements 315 may be on corresponding lines of the first file and the second file, which allows the remote computer 145 to compare the messages 160 more quickly than comparing the messages 160 according to the format of the respective databases 155.

Additionally, each message 160 may include one or more message metadata 165. The message metadata 165 may provide metadata or attributes of messages 160, e.g., conditions of the vehicle, the vehicle component 135, etc., when the message 160 was generated by the ECU 120. The metadata 165 may indicate, e.g., a source of the message 160, a destination of the message 160, a time stamp of when the message 160 was generated, a datatype of the message 160, etc. The metadata 165 can include, e.g., a string of alphanumeric bits, a string of binary digits, a string of hexadecimal digits, etc. The remote computer 145 may display the metadata 165 on the same line as the respective message 160 element 315 in the first file and the second file. In other words, the remote computer 145 may display the metadata 165 next to the respective message 160 elements 315 in the respective file.

The ECUs 120 may receive raw data, e.g., from one or more sensors 125, and convert the raw data into the data 170. The data 170 indicates at least one characteristic of a vehicle component 135. For example, the data 170 may indicate a speed, a position, an output, etc., of a vehicle component 135. The data 170 may include one or more data. In this context, each datum may indicate one characteristic of the vehicle component 135. Accordingly, the data 170 elements 320 are children of the respective message 160 elements 315 in the data hierarchy 300.

Each datum 170 includes a descriptor. In this context, a "descriptor" is a string of data corresponding to the specific datum, i.e., an identifier for the datum. In other words, the descriptor identifies the specific datum. The descriptor can be, e.g., a string of alphanumeric bits, a string of binary digits, a string of hexadecimal digits, etc. In the context of this disclosure, the descriptor can indicate, e.g., a physical characteristic of a vehicle component 135.

The data 170 elements 320 may be stored according to, or with a pointer to or description of their place in the data hierarchy 300; further, data 170 elements 320 that are children of the same parent message 160 element 315 may be stored according to a sorting rule. For example, the remote computer 145 may sort the data 170 elements 320 according to the descriptors of the datum. The remote computer 145 may sort by, e.g., alphabetizing the descriptors of the datum, arranging the descriptors in ascending or descending order, etc. Sorting the data 170 elements 320 within the data hierarchy 300 can allow the remote computer 145 to quickly compare data 170 of one message 160 of the first ECU 122 to data 170 of the same message 160 of the second ECU 124. The remote computer 145 may store each data 170 element 320 on a separate line of the respective file. Since the remote computer 145 sorts the data 170 elements 320 of the first file and the second file according to the descriptor, the respective data elements 320 may be on the same corresponding lines of the first file and the second file, which allows the remote computer 145 to compare the data 170 more quickly than comparing the data 170 according to the format of the respective databases 155.

Additionally, each datum may be described by an attribute or attributes in metadata 175. The metadata 175 may provide metadata regarding the data 170 obtained, e.g., by the sensors 125. The metadata 175 may indicate, e.g., a range, a resolution, units, discrete values, scaling factors, bit position, number of bits occupied, etc. The metadata 175 can be, e.g., a string of alphanumeric bits, a string of binary digits, a string of hexadecimal digits, etc. The remote computer 145 may display the metadata 175 on the same line as the respective datum in the first file and the second file. In other words, the remote computer 145 may display the metadata 175 next to the respective data 170 in the respective file.

Figure 4:
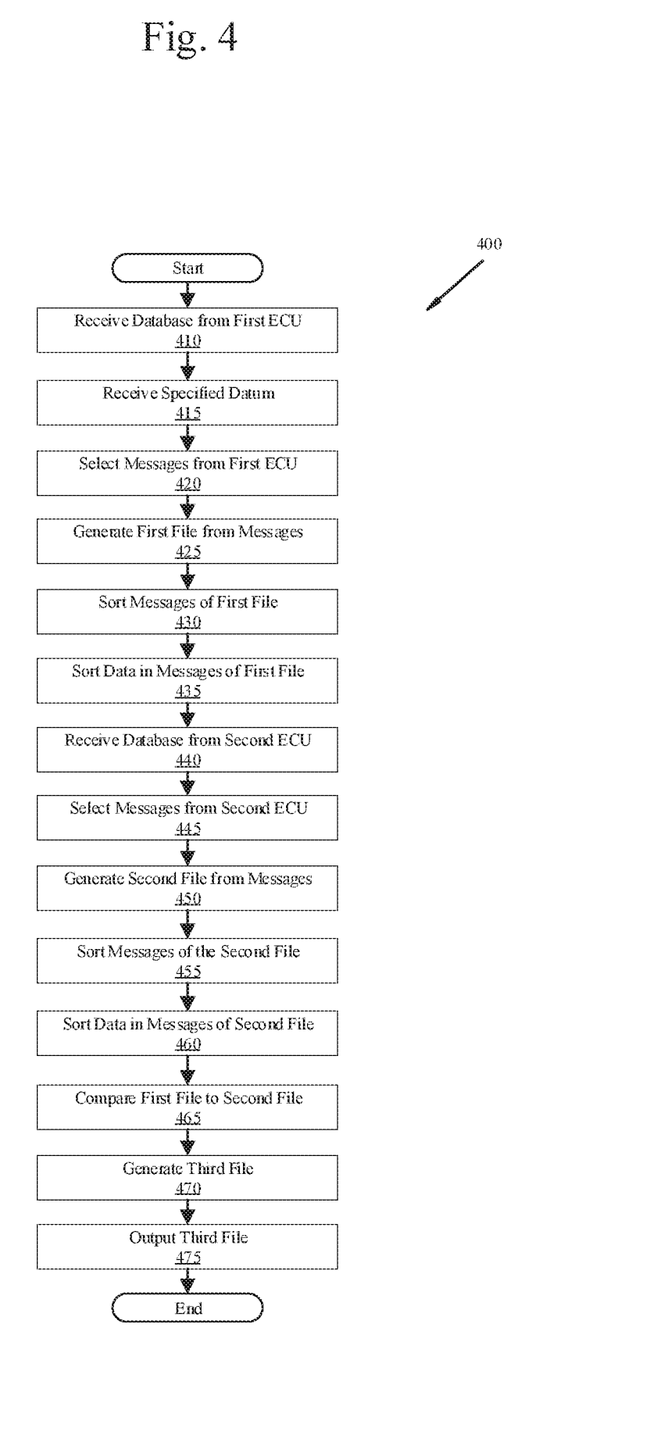
FIG. 4 is a flow chart of an exemplary process to compare the first ECU to the second ECU.

FIG. 4 illustrates a flowchart of an exemplary process that can be implemented in the remote computer 145 to receive a database 155 from the vehicle computer 115 of the first vehicle 105 and a database 155 from the vehicle computer 115 of the second vehicle 110, to generate a first file and a second file based on a specified datum, to generate a third file based on a comparison of the first file and the second file, and to output the third file.

The process 400 begins in block 410, in which the remote computer 145 receives one or more messages 160 from the first ECU 122. For example, the remote computer 145 may be in communication, e.g., direct or indirect, with the first ECU 122 such that the remote computer 145 may receive messages 160 (including data 170) from the first ECU 122 according to the format of a database 155. The remote computer 145 may receive the messages 160 directly from the first ECU 122, e.g., when the first ECU 122 is included in the test bench 150. In this situation, the first ECU 122 may transmit the messages 160 to the remote computer 145, e.g., via a wired connection. Alternatively, the remote computer 145 may receive the messages 160 from the vehicle computer 115 of a first vehicle 105. In this situation, the first ECU 122 may transmit the messages 160 to the vehicle computer via the vehicle network, and the vehicle computer 115 may transmit the database 155 to the remote computer 145 via the network 140. The first ECU 122 may output data into the database 155 according to the format of the database 155.

Next, in a block 415, the remote computer 145 receives a specified datum. For example, a user may input the specified datum into the remote computer 145. The remote computer 145 may include one or more input fields into which the user can input the specified datum. For example, the user may input a string, e.g., numeric, alphanumeric, etc., as the specified datum. The specified datum may identify data within the database 155, e.g., a message 160 identifier, a data 170 descriptor, message 160 metadata 165, data 170 metadata 175, etc. Additionally, in situations where the remote computer 145 receives the database 155 from a vehicle computer 115, the specified datum may additionally identify the name of the ECU 120. The user may input one or more specified data into the remote computer 145.

Next, in a block 420, the remote computer 145 selects messages 160 from the first ECU 122. For example, the remote computer 145 may search through the database 155 and select messages 160 that match the specified datum, i.e., include the same data string. That is, the remote computer 145 may filter the database 155 to identify messages 160 based on the specified datum. In this context, "selects" means to copy from the database 155 without altering the database 155 or the data therewithin. When the ECU 120 is in the first vehicle 105, the specified datum may include a name of the first ECU 122 and a message 160 identifier. In this situation, the remote computer 145 may search the database 155 for, and select the specified messages 160 output by, the first ECU 122. When the ECU 120 is on the test bench 150, the specified datum may include a message 160 identifier. In this situation, the remote computer 145 may search the portion of the database 155 received by the first ECU 122 for and select the specified messages 160.

Next, in a block 425, the remote computer 145 generates the first file based on the selected message 160. The first file may be separate from the database 155. In other words, the remote computer 145 typically does not alter or modify the database 155 when the remote computer 145 generates the first file. The remote computer 145 inserts the selected messages 160 into the first file. The remote computer 145 may format the first file according to the data hierarchy 300. In other words, the remote computer 145 may sort the data obtained from the database 155 into a format that differs from the format of the database 155. For example, the first file may display the database 155 element 305 as the root, i.e., highest, node and ECU 120 elements 310 as child nodes of the database 155 element 305. In other words, the first file may display the version name of the database 155 and the name of each ECU 120, e.g., on separate lines, below the version name of the database 155. Additionally, the first file may display the message 160 elements 315 as child nodes of respective ECU 120 elements 310 and the data 170 elements 320 as child nodes of respective message 160 elements 315. For example, each message 160 element 315 may be displayed on separate lines below the respective ECU 120 element 315, and each data 170 element 320 may be displayed on separate lines below the respective message 160 element 315.

Next, in a block 430, the remote computer 145 sorts the message 160 elements 315 of the first ECU 122 according to a sorting rule, e.g., alphabetic, ascending or descending order, etc. For example, the remote computer 145 may sort the message 160 elements 315 according to the message 160 identifier. The remote computer 145 may display the message 160 elements 315 in the first file based on the sorting rule.

Next, in a block 435, the remote computer 145 sorts the data 170 elements 320 of each respective message 160 according to the sorting rule, e.g., alphabetic, ascending or descending order, etc. For example, the remote computer 145 may sort the data 170 elements 320 according to the data 170 descriptor. The remote computer 145 may display the data 170 elements 320 in the first file based on the sorting rule.

Next, in a block 440, the remote computer 145 receives one or more messages 160 from the second ECU 124. For example, the remote computer 145 may be in communication with the second ECU 124 such that the remote computer 145 may receive messages 160 (including data 170) from the first ECU 122 according to the format of a database 155. The remote computer 145 may receive the messages 160 from the second ECU 124, e.g., when the second ECU 124 is on the test bench 150. In this situation, the second ECU 124 may transmit the messages 160 to the remote computer 145, e.g., via a wired connection. Alternatively, the remote computer 145 may receive the messages 160 from the vehicle computer 115 of a second vehicle 110. In this situation, the second ECU 124 may transmit the messages 160 to the vehicle computer via the vehicle network, and the vehicle computer 115 may transmit the database 155 to the remote computer 145 via the network 140. The second ECU 124 may output data into the database 155 according to the format of the database 155. The remote computer 145 may receive the database 155 from the second ECU 124 in a same or different manner as the remote computer 145 receives the database 155 from the first ECU 122. The database 155 from the second ECU 124 may be a different version than the database 155 from the first ECU 122.

Next, in a block 445, the remote computer 145 selects messages 160 from the second ECU 124. For example, the remote computer 145 may search through the database 155 and select messages 160 that match the specified datum, i.e., include a same numeric or alphanumeric string. That is, the remote computer 145 may filter the database 155 to identify messages 160 based on the specified datum. In this context, "selects" means to copy from the database 155 without altering the database 155 or the data within. When the ECU 120 is in the second vehicle 110, the specified datum may include a name of the second ECU 124 and a message 160 identifier. In this situation, the remote computer 145 may search the database 155 for and select the specified messages 160 output by the second ECU 124. When the ECU 120 is on the test bench 150, the specified datum may include a message 160 identifier. In this situation, the remote computer 145 may search the portion of the database 155 received by the second ECU 124 for and select the specified messages 160.

Next, in a block 450, the remote computer 145 generates the second file based on the selected message 160. The second file may be separate from the database 155. In other words, the remote computer 145 may not alter the database 155 when the remote computer 145 generates the second file. The remote computer 145 inserts the selected messages 160 into the second file. The remote computer 145 may format the second file according to the data hierarchy 300. In other words, the remote computer 145 may sort the first file and the second file in the same manner. In these circumstances, each file includes the same parent nodes and children nodes displayed on corresponding lines.

Next, in a block 455, the remote computer 145 sorts the message 160 elements 315 of the second ECU 124 according to a sorting rule, e.g., alphabetic, ascending or descending order, etc. The sorting rule is the same for the second ECU 124 and the first ECU 122, i.e., message 160 elements 315 of the first file and the second file are sorted the same. In these circumstances, each file displays the same message 160 elements 315 for the respective ECUs 120 on corresponding lines.

Next, in a block 460, the remote computer 145 sorts the data 170 elements 320 of each respective message 160 according to a sorting rule, e.g., alphabetic, ascending or descending order, etc. The sorting rule is the same for the second ECU 124 and the first ECU 122, resulting in displaying or including the same data 170 elements 320 for the respective messages 160 on corresponding lines of the respective files.

Next, in a block 465, the remote computer 145 compares the first file to the second file, e.g., according to a "diff" program as is known. The remote computer 145 may, for example, compare the first file to the second file to determine line and/or character differences between the files. Since the first file and the second file are structured according to the data hierarchy 300, the remote computer 145 can quickly compare the corresponding lines of the files to determine differences between the files.

Next, in a block 470, the remote computer 145 generates a third file. The third file displays the comparison between the first file and the second file. The third file may, for example, display the first file next to, e.g., side-by-side with, the second file. The third file may thus display the entire first and second files with the identified differences between the corresponding lines of the files highlighted. As another example, the third file may display a list of differences between the first file and the second file. In this example, the third file displays only the corresponding lines of the first and second files that include differences identified by the remote computer 145, i.e., a portion of the first and second files. The remote computer 145 may display identified differences between the first file and the second file, e.g., by highlighting the entire line including the identified difference, by changing the text color of identified differences, etc.

Next, in a block 475, the remote computer 145 outputs the third file, e.g., to the user. The remote computer 145 may, for example, electronically display the third file such that the user can review the third file on the remote computer 145. The process ends following the block 475.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving, via a communications bus, a first database including messages indicating a status of a first vehicle component from a first electronic control unit (ECU) programmed to control the first vehicle component;
   receiving, via the communications bus, a second database including messages indicating a status of a second vehicle component from a second ECU programmed to control the second vehicle component, wherein the second database has a different format than the first database and the second vehicle component is one of a) the first vehicle component, or b) a same type as the first vehicle component;
   selecting, from the first database, messages of the first ECU according to a specified datum that the first ECU is programmed to provide via the communications bus;
   generating a first file of the selected messages of the first ECU;
   sorting the messages in the first file according to a hierarchy that includes the specified datum;
   selecting, from the second database, messages of the second ECU according to the specified datum;
   generating a second file of the selected messages of the second ECU;
   sorting the messages in the second file according to the hierarchy; and
   outputting a third file describing a comparison of the first file and the second file.

2. The method of claim 1, further comprising sorting the messages in the first file according to an identifier.

3. The method of claim 1, further comprising sorting data in the messages in the first file according to a descriptor.

4. The method of claim 1, wherein the third file includes at least one of a side-by-side comparison of the first file and the second file and a list of differences between the first file and the second file.

5. The method of claim 1, further comprising displaying each message of the first file on a separate line and displaying each datum of each message of the first file on a separate line.

6. The method of claim 5, further comprising displaying metadata of each message of the first file on the same line as the respective message and displaying metadata of each datum of each message of the first file on the same line as the respective datum.

7. The method of claim 1, wherein the hierarchy includes data below the respective message, each message below the respective ECU, and the ECU below the database.

8. The method of claim 1, wherein the specified datum is at least one of a name of the first ECU, metadata of the messages of the first file, and metadata of data of the messages of the first file.

9. The method of claim 1, wherein each message includes an identifier and data of at least one characteristic of a vehicle component.

10. The method of claim 1, wherein the first vehicle component is one of a steering component, a braking component, or a propulsion component.

11. A system, comprising a computer including a processor and a memory, the memory storing instructions executable by the processor to:
    receive, via a communications bus, a first database including messages indicating a status of a first vehicle component from a first electronic control unit (ECU) programmed to control the first vehicle component;
    receive, via the communications bus, a second database including messages indicating a status of a second vehicle component from a second ECU programmed to control the second vehicle component, wherein the second database has a different format than the first database and the second vehicle component is one of a) the first vehicle component, or b) a same type as the first vehicle component;
    select, from the first database, messages of the first ECU according to a specified datum that the first ECU is programmed to provide via the communications bus;
    generate a first file of the selected messages of the first ECU;
    sort the messages in the first file according to a hierarchy that includes the specified datum;
    select, from the second database, messages of the second ECU according to the specified datum;
    generate a second file of the selected messages of the second ECU;
    sort the messages in the second file according to the hierarchy; and
    output a third file describing a comparison of the first file and the second file.

12. The system of claim 11, wherein the instructions further include instructions to sort the messages in the first file according to an identifier.

13. The system of claim 11, wherein the instructions further include instructions to sort data in the messages in the first file according to a descriptor.

14. The system of claim 11, wherein the third file includes at least one of a side-by-side comparison of the first file and the second file and a list of differences between the first file and the second file.

15. The system of claim 11, wherein the instructions further include instructions to display each message of the first file on a separate line and to display each datum of each message of the first file on a separate line.

16. The system of claim 15, wherein the instructions further include instructions to display metadata of each message of the first file on the same line as the respective message and to display metadata of each datum of each message of the first file on the same line as the respective datum.

17. The system of claim 11, wherein the hierarchy includes data below the respective message, each message below the first ECU, and the first ECU below the database.

18. The system of claim 11, wherein the specified datum is at least one of a name of the first ECU, metadata of the messages of the first file, and metadata of data of the messages of the first file.

19. The system of claim 11, wherein each message includes an identifier and data of at least one characteristic of a vehicle component.

20. The system of claim 11, wherein the first vehicle component is one of a steering component, a braking component, or a propulsion component.

* * * * *